US006766297B1

(12) United States Patent
Lamer et al.

(10) Patent No.: US 6,766,297 B1
(45) Date of Patent: Jul. 20, 2004

(54) METHOD OF INTEGRATING A PICTURE ARCHIVING COMMUNICATION SYSTEM AND A VOICE DICTATION OR VOICE RECOGNITION SYSTEM

(75) Inventors: Roland Lamer, Evanston, IL (US); Jeremy Malecha, Evanston, IL (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/474,638

(22) Filed: Dec. 29, 1999

(51) Int. Cl.$^7$ .......................... G10L 21/00; G06F 17/30
(52) U.S. Cl. ...................................... 704/270; 707/104
(58) Field of Search ................................ 345/727, 728; 709/229; 707/7, 500.1, 104.1; 705/3, 1; 704/270, 260, 235, 220, 200; 250/581

(56) References Cited

U.S. PATENT DOCUMENTS 6,031,526 A * 2/2000 Shipp ....................... 707/500.1
6,047,257 A * 4/2000 Dewaele ..................... 250/581
6,269,379 B1 * 7/2001 Hiyama et al. ............. 358/296

FOREIGN PATENT DOCUMENTS

WO      WO 95/18441      * 7/1995    ............. G10L/9/00

OTHER PUBLICATIONS

Lai et al., "MedSpeak: Report Creation with Continuous Speech Recognition," in ACM SIG CHI 1997 Conference Proceedings pp. 431–438.*
Philips Medical Systems North America, "News & Events," Sep. 18, 1999, pp. 1–2.*
Elmasari et al., "Fundamental of Database Systems," 1994, 2nd edition, Benjamin/Cummings Publisher.*
Microsoft, "The Windows Interface Guidelines for Software Design," Microsoft Press, 1995.*
Smith et al., "Guidelines for Designing User Interface Software," Aug. 1986, MITRE Corporation, Sections 3.0/1–3.0/7.*

* cited by examiner

Primary Examiner—Richemond Dorvil
Assistant Examiner—V. Paul Harper
(74) Attorney, Agent, or Firm—McAndrews, Held & Malloy, Ltd.; Peter J. Vogel; Michael A. Dellapenna

(57) ABSTRACT

A method for integrating a picture archiving and communication system ("PACS") and a voice dictating or speech recognition system (collectively "voice dictation system") is provided. The method includes logging in to a PACS. The method also includes automatically logging in to a voice dictation system responsive to the logging in step and opening an image file in the PACS. The integration method further includes automatically creating a dictation file associated with the image file in the voice dictation system responsive to at least one of the logging in step, the automatic logging in step or the opening step. The method may optionally include sending a predetermined identifier to the dictation file to associate the image file with the dictation file. The method may additionally optionally include performing the automatic logging in step responsive to the PACS being in a dictation mode. In another exemplary embodiment of the invention, the method for integrating the PACS and a voice dictation system includes issuing a save command for a dictation file and saving the dictation file to memory. The method further includes automatically saving the image file responsive to at least one of the issuing step or the saving step. The method also includes automatically opening an image file in the PACS responsive to at least one of the issuing step, the saving step or the automatic saving step.

9 Claims, 4 Drawing Sheets

METHOD OF INTEGRATING A PICTURE ARCHIVING COMMUNICATION SYSTEM AND A VOICE DICTATION OR VOICE RECOGNITION SYSTEM

CROSS REFERENCE TO RELATED APPLICATIONS (if applicable)

Not Applicable.

STATEMENT REGARDING FEDERALLY SPONSORED RESEARCH & DEVELOPMENT (if applicable)

Not Applicable.

BACKGROUND OF THE INVENTION

The present invention relates to Picture Archiving and Communication Systems ("PACS") and in particular to a method for integrating PACS and voice dictating or speech recognition systems.

Picture Archiving and Communication Systems are used for, among other things, storing, observing and analyzing images obtained in medical applications. PACS may be used with several technologies for observing the interior anatomy of a living being, for example with ultrasound, x-ray or PET images and the like. The viewing and analysis of an image on the PACS is normally done by a physician, for example a radiologist, at one of several workstations present at a hospital, clinic or laboratory, for example.

When using a Picture Archiving and Communication System, it may be desirable for the radiologist or other doctor to dictate a report stating his or her analysis of an image saved in the PACS. In the past, such dictation has occurred through a vehicle, such as a conventional dictation system, a special phone system or a computer (for example a speech recognition system) entirely separate from the Picture Archiving and Communication System. As a result, the dictation must be separately referenced to the analyzed image, transcribed, and inserted into a file for the image. For example, in one known system, a radiologist receives a number of requisitions (i.e., a paper showing, for example, a brief history of the patient and the reason(s) for which imaging was required) indicating his or her work list for the day. The radiologist then calls up on the PACS, by identifying the order or accession number of the patient, the images for the patient in a predetermined order, usually in succession, and separately dictates a report concerning the images. In this report, the physician will identify the order or accession number of the patient, either orally or by typing it into a computer dictation machine. Once the dictation is complete, the dictation report must be separately referenced to the analyzed image, transcribed, and inserted into a file for the image.

The past system of manually associating the dictated report with the analyzed image required a substantial amount of time and resources. Additionally, the past system was subject to errors in associating the dictated report with the proper image.

PACS and computer systems have not yet presented a method of integrating a Picture Archiving and Communication System with a speech recognition system or voice dictating system (collectively "voice dictation systems") that avoids the aforementioned need for manually associating the dictated reports with PACS image files.

A need has long existed for such a method of integrating a Picture Archiving Communication System with a voice dictation system and associating the voice dictation files with image files for easy retrieval.

BRIEF SUMMARY OF THE INVENTION

In an exemplary embodiment of the present invention, a method for integrating a picture archiving and communication system ("PACS") and a voice dictating or speech recognition system (collectively "voice dictation system") is provided. The method includes logging in to a PACS. The method also includes automatically logging in to a voice dictation system responsive to the PACS logging in step and opening an image file (also referred to as an exam file) in the PACS. The exam or image file may contain one or more image files. The exemplary method further includes automatically creating a dictation file associated with the image file in the voice dictation system responsive to at least one of the PACS logging in step, the automatic logging in step or the imaging opening step. The method may optionally include, as part of the automatic creation step, sending a predetermined identifier to the dictation file to associate the image file with the dictation file. The method may additionally optionally include performing the automatic logging in step responsive to the PACS being in a dictation mode.

In another exemplary embodiment of the present invention, the method for integrating the PACS and a voice dictation system includes issuing a save command for a dictation file and saving the dictation file to memory. The method further includes automatically saving the image file responsive to at least one of the issuing step or the saving step. The method also includes automatically opening an image file in the PACS responsive to at least one of the issuing step, the saving step and the automatic saving step.

DETAILED DESCRIPTION OF THE INVENTION

Figure 1:
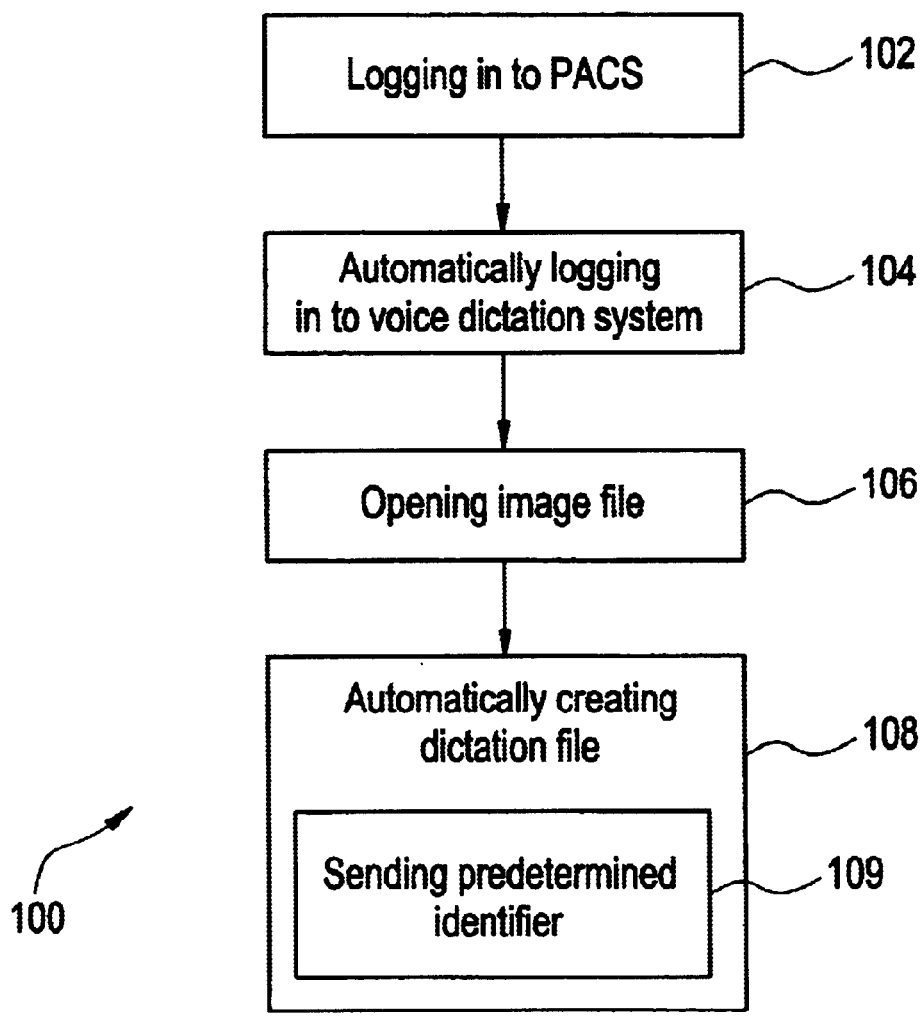
FIG. 1 illustrates a block diagram of a method for integrating a picture archiving and communication system with a voice dictating or speech recognition system according to a particular embodiment of the present invention.

FIG. 1 illustrates a method for integrating a PACS with a voice dictation system 100. The method includes logging in to a PACS at step 102, automatically logging in to a voice dictation system at step 104, and opening an image file at step 106. The method 100 also includes automatically creating a dictation file at step 108 and sending a predetermined identifier at step 109.

Figure 2:
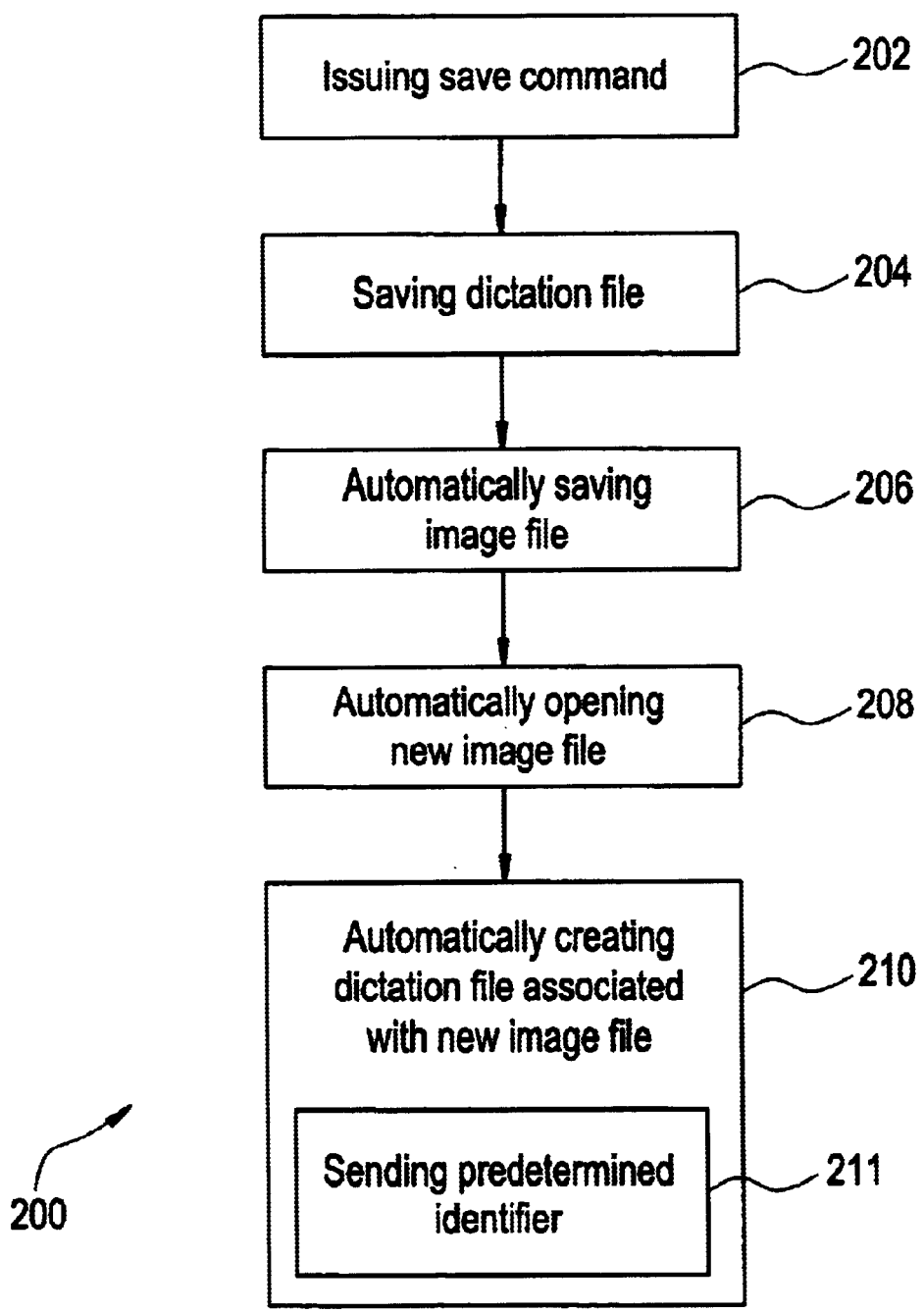
FIG. 2 illustrates a block diagram of a method for integrating a picture archiving and communication system with a voice dictating or speech recognition system according to an alternative embodiment of the present invention.

FIG. 2 illustrates an alternative method for integrating a PACS with a voice dictation system 200 including issuing a save command at step 202, saving a dictation file at step 204 and automatically saving an image file at step 206. The method further includes automatically opening a new image file at step 208 and automatically creating a dictation file at step 210. The illustrated automatic creation step 210 includes sending a predetermined identifier at step 211.

Turning back to FIG. 1, in the course of viewing images on a PACS, a user may log in to an image viewer application in the PACS, which may include entering user information, as illustrated in the logging in step 102. The user may enter, for example, a login name and password. When the user has entered the image viewer application, the user is automatically logged in to a voice dictation system, as illustrated in the automatic login step 104. In a preferred embodiment, the automatic login step 104 occurs when the computer is in dictation mode and as a result of the user logging in to the PACS. In a preferred embodiment, the user is not automatically logged in to the voice dictation system if the PACS is in a non-dictation mode. The automatic login step 104 preferably occurs silently, i.e., without the user being asked to separately log in to the voice dictation system.

The "voice dictation system" in the context of FIG. 1 refers to a system for recording voices or voice data into memory, for example a voice dictation device or a speech recognition system. In a preferred embodiment, the voice dictation system uses either digital dictation software (saved audio that will be transcribed at a later time) or real time speech recognition. If speech recognition software is used, Dragon Voice Engine, created by Talk Technology, Inc. may be used, for example.

Once the user is logged in to both the PACS and automatically logged in to the voice dictation system, the user will then open an image file or start a dictation macro or mode at step 106 to view an image. If the PACS is in dictation mode, the image file opened is most likely the first image file in a list of images the physician/user has on a work list. The images on the work list are generally consecutively numbered with an order number (also referred to as an accession number). In order to ease the burden of dictating reports for the images, the physician-user of the voice dictation system will generally follow the order the images were created in, and therefore organized in the image viewer application software on the PACS. The physician may also have a stack of requisitions also organized by order number. Thus, each image file has an order number (or other identifying information) to distinguish it from other image files. Moreover, the order in which the files were created is generally the way in which a physician will view the images and dictate reports corresponding thereto. (If another order is desired, it may be used. The order, however, is predetermined and present in some form at the PACS workstation).

When the image file is opened at step 106, a dictation file associated with the image file will automatically be created 108. In a preferred embodiment, the dictation file is associated with the image file through use of identifying information for the patient or image, for example the order number. The identifying information may be predetermined information (as, for example, the order number is a predetermined number), as illustrated in sending step 109 of FIG. 1. The dictation file will thus have an association with the image file as a result of the method 100.

As a result of the integrating method 100, the dictation files are automatically associated with the corresponding image file (and preferably saved in tandem) and there is no need for a clerical worker or physician to later look back at the dictation file and determine to which image it corresponds. This will save considerable time and resources because the physician dictating the report does not have to stop dictating and enter an order number or other identifying information before creating each report. That is, the physician may dictate the reports for an entire work list without having to type on the workstation keyboard or select any icons on a computer monitor with a mouse, finger or other object (as will be further discussed below). This will also save time and resources because a clerical worker or physician will not have to review the reports and determine to which image the dictated report corresponds.

Figure 3:
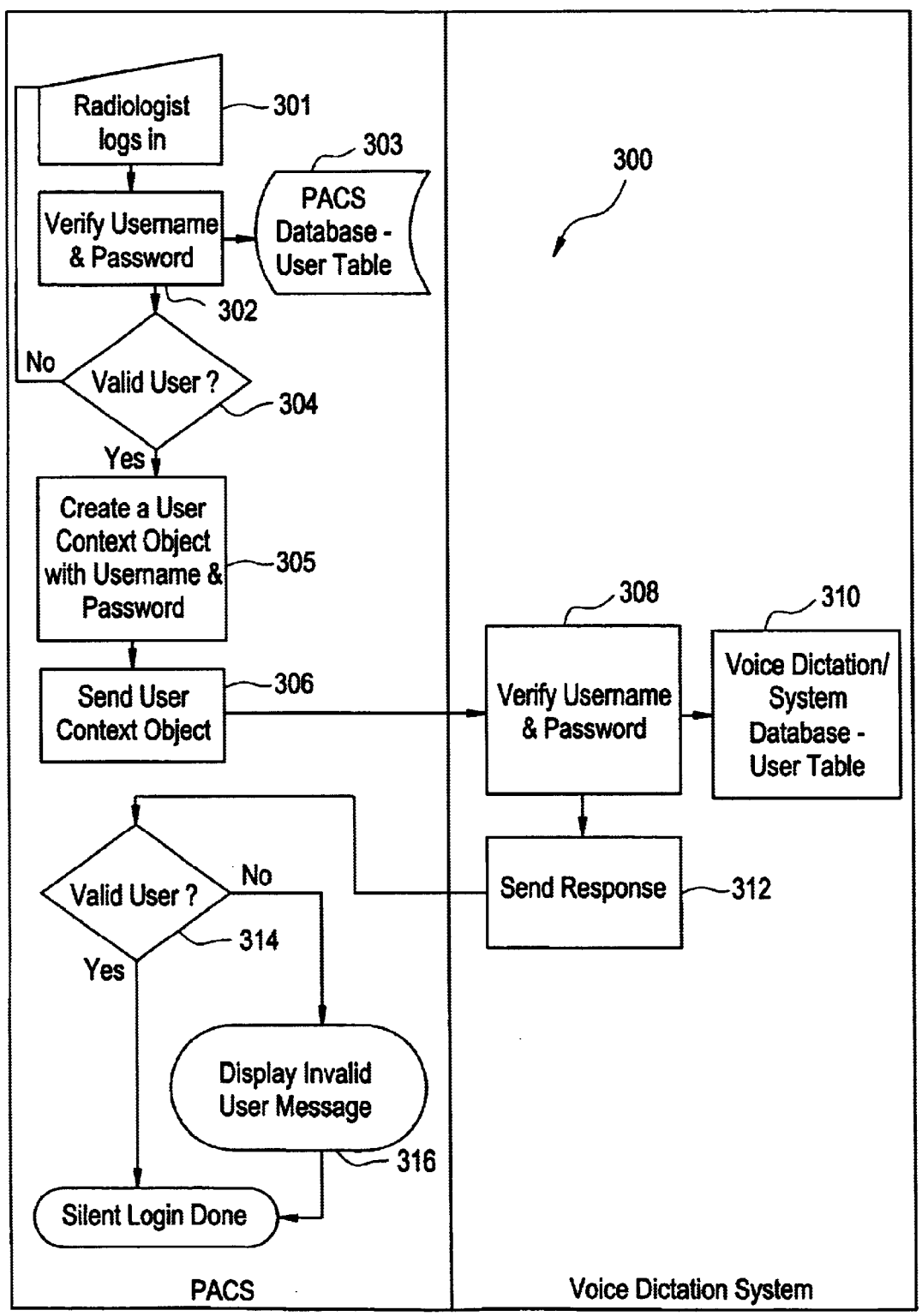
FIG. 3 illustrates a block diagram of a method for integrating a picture archiving and communication system with a voice dictation or speech recognition system according to an alternative embodiment of the present invention.

Turning to FIG. 3, that Figure illustrates a method for integrating a PACS with a voice dictation system 300 in a silent log in operation in greater detail according to a particular embodiment of the present invention. The method 300 includes logging in the PACS at step 301, validating the username and password combination at step 302 in the PACS database 303. If the combination is determined to be valid at step 304, the method includes creating a user context object at step 305, if not a re-login at step 301 is requested. The method 300 also includes sending the user context object to the voice dictation system at step 306. The voice dictation system verifies the username and password combination at step 308 against its own database 310 and sends a validation response back to the PACS at step 312. If the combination is valid as determined at step 314, the silent login method is completed and control is given back to the user, if not an error message is displayed at step 316 and then the control is also given back to the user.

Turning again to FIG. 2, that Figure illustrates a method for integrating the PACS and voice dictation system 200 which operates beyond the initial stage of opening a first image file. Rather, the method 200 operates to speed up the process of dictating several reports with associated images (and image files) on a work list. In the integration method 200, when the user is finished dictating a report, the user will issue a save command at step 202. The term save command in this context refers to a command indicating that the report is complete or that the user would like to save the report at that time. The save command may be, for example, a "save report" statement when speech recognition software is used or a mouse click on an "end", "complete", "save" or other icon indicating that the report is complete. As a result of issuing the save command at step 202, the dictation file will be saved at step 204 and because the image file and the dictation file are associated with one another, the image file will automatically be saved at step 206, including for example any modifications that were made by the physician to the image during dictation of the report.

As a result of integrating the PACS dictation mode with a voice dictation system, the physician may automatically be transferred from file to file on a work list simply by issuing a save command at step 202 to the voice dictation system. This will save the physician considerable time and effort by avoiding the need for the physician to manually or orally enter the order number into a voice dictation system. Errors present in the prior art, for example from a voice file identifying the incorrect image file due to human error, will be significantly reduced.

Figure 4:
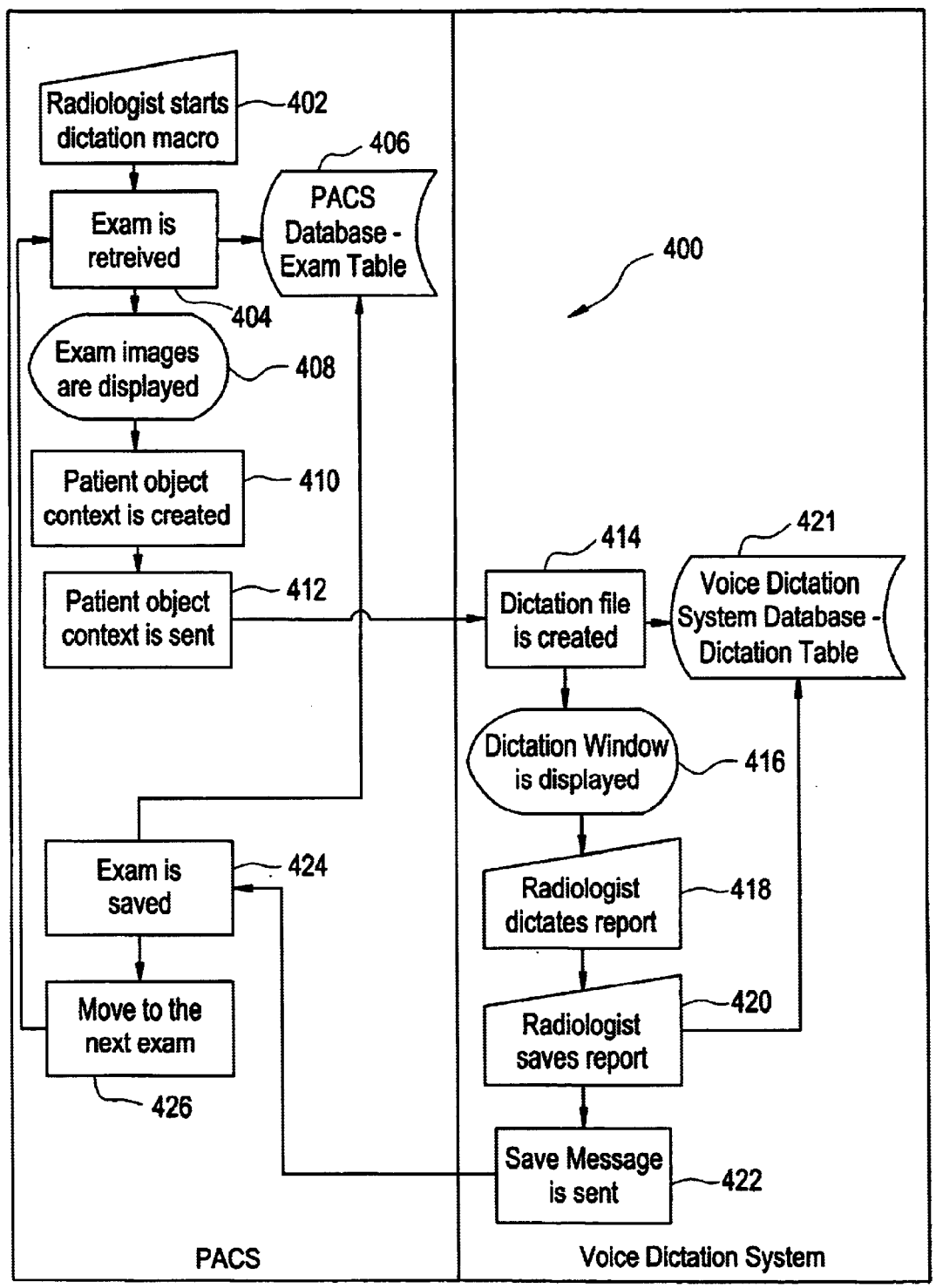
FIG. 4 illustrates a block diagram of a method for integrating a picture archiving and communication system with a voice dictation or speech recognition system according to an alternative embodiment of the present invention.

Turning to FIG. 4, that Figure illustrates an alternative method for integrating a PACS with a voice dictation system 400 in a dictation macro mode in greater detail according to a particular embodiment of the present invention. A user, for example a radiologist, starts the dictation mode at step 402 and the first exam on the exam list is retrieved at step 404 from the PACS database 406. The exam images are displayed at step 408 and a patient object context containing an order or accession number is created at step 410 and sent at step 412 to the voice dictation system. The voice dictation system creates a dictation file at step 414 and opens a voice dictation window at step 416. The radiologist dictates a report at step 418 and saves the report at step 420 in the voice dictation system database 421. The voice dictation system may then send a save command at step 422 to the PACS. The exam is saved at step 424 in the PACS database 406 and the method 400 moves to another exam, preferably the next exam on the exam list, at step 426.

In general, as a result of the integrating methods, significant advantages may be achieved. First, the PACS workstation user may be automatically logged in to a voice dictation system. Second, the dictation files may be created automatically and be associated with the corresponding image file without any additional action by the PACS workstation user. Third, updates to image files made during a dictation may be automatically saved because the image files are associated with the dictation files. Fourth, new image files may be automatically opened for the PACS workstation user.

Referring generally to FIGS. 1 through 4, the components of the PACS, the PACS workstation and voice dictation system may be implemented using combinatorial logic, an ASIC, through software implemented by a CPU, a DSP chip, or the like. Additionally, the foregoing hardware elements may be part of hardware that is used to perform other operational functions. The images, image files, dictation files, identifying data (including, for example, order or accession numbers) may be stored in registers, RAM, ROM, or the like, and may be generated through software, through a data structure located in a memory device such as RAM or ROM, and so forth.

While particular embodiments of the invention have been shown, it will be understood, of course, that the invention is not limited thereto since modifications may be made by those skilled in the art, particularly in light of the foregoing teachings. It is, therefore, contemplated that the appended claims will cover any such modifications as incorporate those features that constitute the essential features of these improvements within the true spirit and the scope of the invention.

What is claimed is:

1. A method for integrating a Picture Archiving and Communication System with a voice dictation system, said method comprising:
   logging in to a Picture Archiving and Communication System;
   automatically logging in to a voice dictation system responsive to said PACS logging in step;
   opening an image file in the PACS; and
   automatically creating an electronic voice dictation file associated with the image file responsive to said opening step,
   wherein said automatic creation step comprises automatically providing a predetermined identifier to the dictation file to electronically link the image file with the dictation file.

2. The method of claim 1 wherein said automatic logging in step is performed responsive to the PACS being in a dictation mode.

3. The method of claim 1 wherein said opening step comprises opening the first image file of a predetermined order of image files.

4. A method for integrating a Picture Archiving and Communication System with a voice dictation system, said method comprising:
   issuing a save command for a first electronic dictation file;
   saving the first dictation file to memory;
   automatically saving a first electronic file containing medical image data, including any image manipulation, responsive to at least one of said issuing step or said saving step;
   automatically opening a second electronic image file responsive to at least one of said issuing step, said saving step, or said automatic saving step; and
   automatically creating a second electronic dictation file associated with the second image file responsive to at least one of said automatic selecting or opening steps;
   wherein said automatic creation step comprises automatically providing a predetermined identifier to the dictation file to electronically link the image file with the dictation file.

5. The method of claim 4 wherein said automatic creation step comprises creating the dictation file responsive to said automatic opening step.

6. A method for integrating a Picture Archiving and Communication System with a voice dictation system, said method comprising:
   opening an image file in a PACS; and
   automatically generating an electronic voice dictation file responsive to said opening step;
   wherein said automatic creation step comprises automatically providing a predetermined identifier to the dictation file to electronically link the image file with the dictation file.

7. A method for integrating a Picture Archiving and Communication System with a voice dictation system, said method comprising:
   logging in to a Picture Archiving and Communication System;
   automatically logging in to a voice dictation system responsive to said PACS logging in step;
   opening an electronic file containing medical image data; and
   responsive to said opening step, automatically generating an electronic voice dictation file electronically linked to the image file,
   wherein said automatic generation step comprises automatically providing an identifier to the dictation file to electronically link the image file with the dictation file.

8. The method of claim 7 wherein said automatic logging in step is performed responsive to the PACS being in a dictation mode.

9. The method of claim 7 wherein said opening step comprises opening the first image file of a predetermined order of electronic image files.

* * * * *

UNITED STATES PATENT AND TRADEMARK OFFICE
CERTIFICATE OF CORRECTION

PATENT NO. : 6,766,297 B1  
DATED : July 20, 2004  
INVENTOR(S) : Roland Lamer and Jeremy Malecha Page 1 of 1

It is certified that error appears in the above-identified patent and that said Letters Patent is hereby corrected as shown below:

<u>Title page,</u>
Item [54], Title, delete "DICTATION" and substitute therefor -- DICTATING --; and after the word "OR" delete "VOICE" and substiute therefor -- SPEECH --.

Signed and Sealed this

Twenty-third Day of November, 2004

JON W. DUDAS  
*Director of the United States Patent and Trademark Office*